(12) United States Patent
Coad et al.

(10) Patent No.: US 12,337,476 B2
(45) Date of Patent: Jun. 24, 2025

(54) DEVICE TO ALLOW RETRACTION OF SOFT GROWING ROBOTS WITHOUT BUCKLING

(71) Applicant: The Board of Trustees of the Leland Stanford Junior University, Stanford, CA (US)

(72) Inventors: Margaret M. Coad, Mishawaka, IN (US); Rachel Thomasson, Stanford, CA (US); Laura H. Blumenschein, Lafayette, IN (US); Nathan Scot Usevitch, Bothell, WA (US); Allison M. Okamura, Mountain View, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 4 days.

(21) Appl. No.: 17/764,765

(22) PCT Filed: Oct. 9, 2020

(86) PCT No.: PCT/US2020/055112
§ 371 (c)(1),
(2) Date: Mar. 29, 2022

(87) PCT Pub. No.: WO2021/072295
PCT Pub. Date: Apr. 15, 2021

(65) Prior Publication Data
US 2022/0355468 A1 Nov. 10, 2022

Related U.S. Application Data

(60) Provisional application No. 62/914,435, filed on Oct. 12, 2019.

(51) Int. Cl.
*B25J 5/00* (2006.01)
*B25J 9/14* (2006.01)

(52) U.S. Cl.
CPC .............. *B25J 9/142* (2013.01); *B25J 5/007* (2013.01)

(58) Field of Classification Search
CPC ... B25J 9/142; B25J 9/144; B25J 9/146; B25J 5/007; B25J 9/148; F16B 15/12; F16L 55/265; F16L 55/179; F16L 55/1651
See application file for complete search history.

(56) References Cited

U.S. PATENT DOCUMENTS 6,846,029 B1 * 1/2005 Ragner ................ B25B 9/00
294/219
7,311,121 B2 * 12/2007 Kamiyama ......... E21B 41/0042
264/269

(Continued)

FOREIGN PATENT DOCUMENTS

WO    WO2004020893        3/2004
WO    WO-2004020893 A1 *  3/2004  ............. B29C 63/36

*Primary Examiner* — Zakaria Elahmadi
(74) *Attorney, Agent, or Firm* — LUMEN PATENT FIRM

(57) ABSTRACT

Technology is provided for controlling the motion of soft growing robots during retraction to prevent uncontrollable buckling or bending. A double walled flexible tubular robot is provided with an inside wall, an outside wall, and a folded tip. A retraction device located at the folded tip has a routing aperture sized to encompass the inside wall and for routing the inside wall through the retraction device. The retraction device further has a retraction mechanism inside the retraction device to controllably retract material of the inside wall through the routing aperture in the direction away from the folded tip, thereby decreasing the outside wall, creating more inside wall, and as such shortening the length of the flexible robot. This technology enables behaviors, such as (1) growing in one direction, and then retracting and grow- (Continued)

ing in a different direction, and (2) retracting through a confined space without applying force to the environment.

4 Claims, 15 Drawing Sheets

(56) References Cited

U.S. PATENT DOCUMENTS

| | | | | |
|---|---|---|---|---|
| 8,141,647 | B2* | 3/2012 | Kriesels | E21B 43/105 |
| | | | | 166/207 |
| 9,282,993 | B1* | 3/2016 | Cohen | A61B 17/3421 |
| 2017/0253438 | A1* | 9/2017 | Tanaka | B65G 47/917 |
| 2019/0217908 | A1* | 7/2019 | Hawkes | F01B 19/04 |
| 2019/0299424 | A1* | 10/2019 | Curhan | B25J 15/0023 |

* cited by examiner

DEVICE TO ALLOW RETRACTION OF SOFT GROWING ROBOTS WITHOUT BUCKLING

FIELD OF THE INVENTION

This invention relates to soft growing robots and specifically technology for retraction to control the force and position of the robot's tip.

BACKGROUND OF THE INVENTION

Pneumatically everting soft robots imitate plant-like growth by extending new material from their tip to navigate their environment. Movement through growth allows these robots to navigate easily through cluttered environments by deforming around or through obstacles, moving independent of surface friction, and expanding their length many times over from a small form factor. Adding methods to asymmetrically shorten or lengthen the exterior surface of the soft robot body, such as pneumatic artificial muscles, allows for steering of the tip in three degrees of freedom during growth. Pneumatically everting soft robots have been successfully deployed for exploration in an archaeological environment, allowing for videography of tunnels not previously achievable, and in a hydraulic system, showing promise for underwater applications such as exploration of coral reefs.

Up to this point, most of the work on these robots has focused on their lengthening, or growth, instead of reversing growth, or retraction. Control of the motion of the robot and the forces it exerts on the environment is difficult during retraction, because the soft robot body tends to buckle, especially after having grown to long lengths or into curved shapes. Adding the ability to controllably reverse growth would enable the steering actuators already used during growth to control the motion and forces applied by the robot during retraction, opening up new capabilities for navigation and interaction. Controlled force during retraction would enable removal of the robot without damage to an explored delicate environment. Additionally, inversion of material at the tip can create a grasping behavior when an object is engulfed by the soft robot during retraction. The present invention addresses this need.

SUMMARY OF THE INVENTION

The present invention provides a device, system, and method for controlling the motion of a flexible (soft) robot during retraction to prevent buckling. In one embodiment, a double walled flexible tubular robot is provided with an inside wall, an outside wall, and a folded tip.

A retraction device is located at the folded tip such that the outside wall encloses the retraction device. The retraction device has a routing aperture sized to encompass the inside wall and for routing the inside wall through the retraction device. The retraction device further has a retraction mechanism inside the retraction device to controllably retract material of the inside wall through the routing aperture in the direction away from the folded tip, thereby decreasing the outside wall, creating more inside wall, and as such shortening the length of the flexible robot (FIG. 6B).

Examples of the retraction mechanism are (a) two parallel aligned motor-driven rollers with sufficient spacing for the inside wall, and wherein the parallel aligned motor-driven rollers retract the inside wall by rolling in opposite directions from each other and as such squeezing the inside wall as it is passed between the parallel aligned motor-driven rollers, or (b) a grasping mechanism, an intermittently grasping mechanism, or a telescoping grasping mechanism, each capable of grasping the inside wall and retracting the grasped inside wall away from the folded tip.

The flexible robot is a pneumatically controlled flexible robot with pneumatic pressure inside the double wall.

As a method of controlling a flexible robot, one would have or provide a double walled flexible tubular robot with an inside wall, an outside wall, and a folded tip. A retraction device is the positioned and located at the folded tip. The outside wall encloses the retraction device. The retraction device has a routing aperture sized to encompass the inside wall and for routing the inside wall through the retraction device. The method further includes controllably retracting the material of the inside wall through the routing aperture in the direction away from the folded tip, thereby decreasing the outside wall, creating more inside wall, and as such shortening the length of the flexible robot.

To obtain the double walled flexible robot, a flexible tube is provided with a first lumen, and a length section of the flexible tube is folded back into the first lumen of the flexible tube, thereby forming the flexible robot. The flexible robot has a double wall having an inside wall with a second lumen, an outside wall, and a folded tip at the fold of the flexible tube.

Embodiment of the invention allows soft growing robots to be retracted without uncontrollable bending/buckling of their body/wall material.

BRIEF DESCRIPTION OF THE DRAWINGS

FIG. 3A: For straight robots, we consider the wall as an inflated beam undergoing an axial load due to the tail tension applied on the robot tip. FIG. 3B: For curved robots, we consider the wall as an inflated beam with a moment applied about Point 1 due to tail tension applied on the robot tip.

FIG. 5A: All FBDs represent forces applied near the robot tip. FBDs are shown for (FIG. 5B) the soft robot body during inversion without the device, (FIG. 5C) the soft robot body when the device acts on it during inversion, (FIG. 5D) the device during inversion, and (FIG. 5E) one of the two rollers within the device during inversion. The device exerts a force Fd on the tail of the soft robot body while providing an equal and opposite grounding force Fg on the robot tip. Because the applied force is grounded to the robot tip, buckling due to this force is impossible, since the effective robot length for this force is zero. The device applies force through friction from a pair of motor-driven rollers that squeeze the tail.

FIG. 11A shows a rendering of the tip mount, retraction device and a rolling interlock that is used to connect the inner and outer pieces in a way that allows force transmission but still allows the wall material to pass in between in a low friction manner. FIG. 11B shows a retraction device including passive rollers as part of the routing aperture to decrease friction with the robot tip and motor-driven rollers to apply retraction forces on the robot tail, and FIG. 11C shows an example of the retraction mechanism.

DETAILED DESCRIPTION

Figure 1:
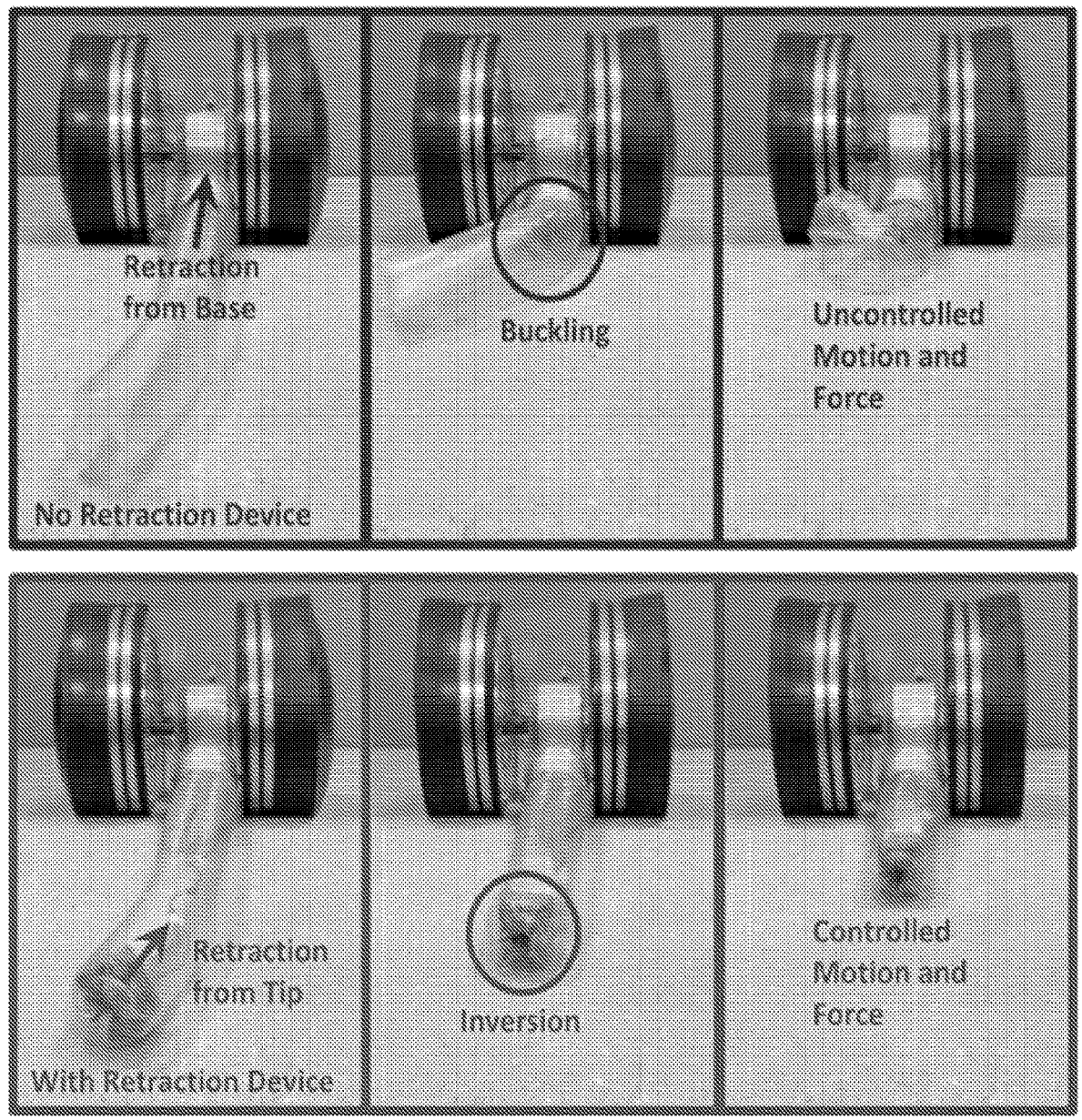
FIG. 1 shows according to an exemplary embodiment of the invention a demonstration of a device to control retraction of a soft growing robot. After the robot grows from the base through eversion of its body material, retraction is attempted in two different ways: via tension applied on the robot tail with a motor in the base (top), and via tension applied on the robot tail with a motorized retraction device at the tip (bottom). Without the device, the soft robot body often buckles, resulting in a lack of control over its motion and force. With the device, the robot body retracts controllably through inversion of its body material.

In this description, the challenges associated with retraction are first explained. A model is then presented for predicting when controlled retraction is and is not possible. Specifically, the model predicts when buckling and inversion occur during retraction. A device is then presented to aid in controlled retraction without buckling (FIG. 1). To demonstrate the device, examples of behaviors made possible by controlled retraction of pneumatically everting soft robots are described.

Problem Statement

There are two behaviors that can occur when attempting to retract a pneumatically everting soft robot by pulling back on the inner body material from the base: "inversion" and "buckling." During inversion, the outer robot body material (the "wall") inverts back into the deployed body at the robot tip and becomes the new inner robot body material (the "tail"). This results in movement of the robot tip in the direction opposite growth, as desired. In contrast, during buckling, the wall folds over on itself, allowing the tail to be pulled towards the base without inversion and by moving the tip in a different direction. These two behaviors are shown in FIG. 1.

The ability to control both the tip position and the force exerted on the environment is lost when buckling occurs. If a soft robot body is not constrained by the environment, the actual motion of the robot tip during buckling tends to be perpendicular to its desired motion. Additionally, if the soft robot body would normally buckle in free space but is held in place by the environment, the robot body applies uncontrolled forces to the environment during retraction. The buckled shape of the soft robot body is unpredictable.

If sufficient force can be exerted from the robot base to retract the soft robot body after buckling, it is possible to pull the soft robot body into the base in an uncontrolled manner (through buckling and then inversion of the buckled robot body) and then start over with controlled growth from zero length. An analysis of the force required to retract such a curved robot shows that the force required to retract the soft robot body grows exponentially with the total angle formed by the path of the robot body.

Based on these considerations, the objective of this invention is to not only understand why buckling during retraction occurs instead of inversion, but then to also develop technology to ensure inversion of the robot body under all conditions, without buckling.

Modeling and Experimental Characterization

To understand how to prevent buckling during retraction, a series of experiments were conducted using a base and a model was developed to predict when a soft robot body will buckle and when it tries to invert. In the model it was assumed that a robot of a given length, pressure, and curvature will either invert or buckle, depending on which behavior requires the lowest force applied on the tail. Because straight robots tend to buckle partway along their length during retraction (similar to axial buckling of inflated beams) and curved robots tend to buckle at the base during retraction (similar to transverse buckling of inflated beams), straight and curved robots were modeled separately. The following sections describe the experiments and equations used to create the model.

Tail Tension During Inversion

During inversion, tension in the tail and in the wall together resist the internal pressure (see also infra). Tension in the tail is higher than tension in the wall due to the additional force needed to deform the soft robot body material at the tip as the material transitions from being part of the wall to being part of the tail. The tension in the tail during inversion $T_T$ as a function of pressure P was modeled as:

$$T_T = \tfrac{1}{2}PA + F_I, \quad \text{Equation 1}$$

where A is the cross-sectional area of the soft robot body (i.e. $\pi R^2$, where R is the soft robot body radius) and $F_I$ is the additional force in the tail required to invert the soft robot body due to material deformation at the tip. The exact value of $F_I$ likely depends on the material properties, diameter, and thickness of the robot body.

Figure 2:
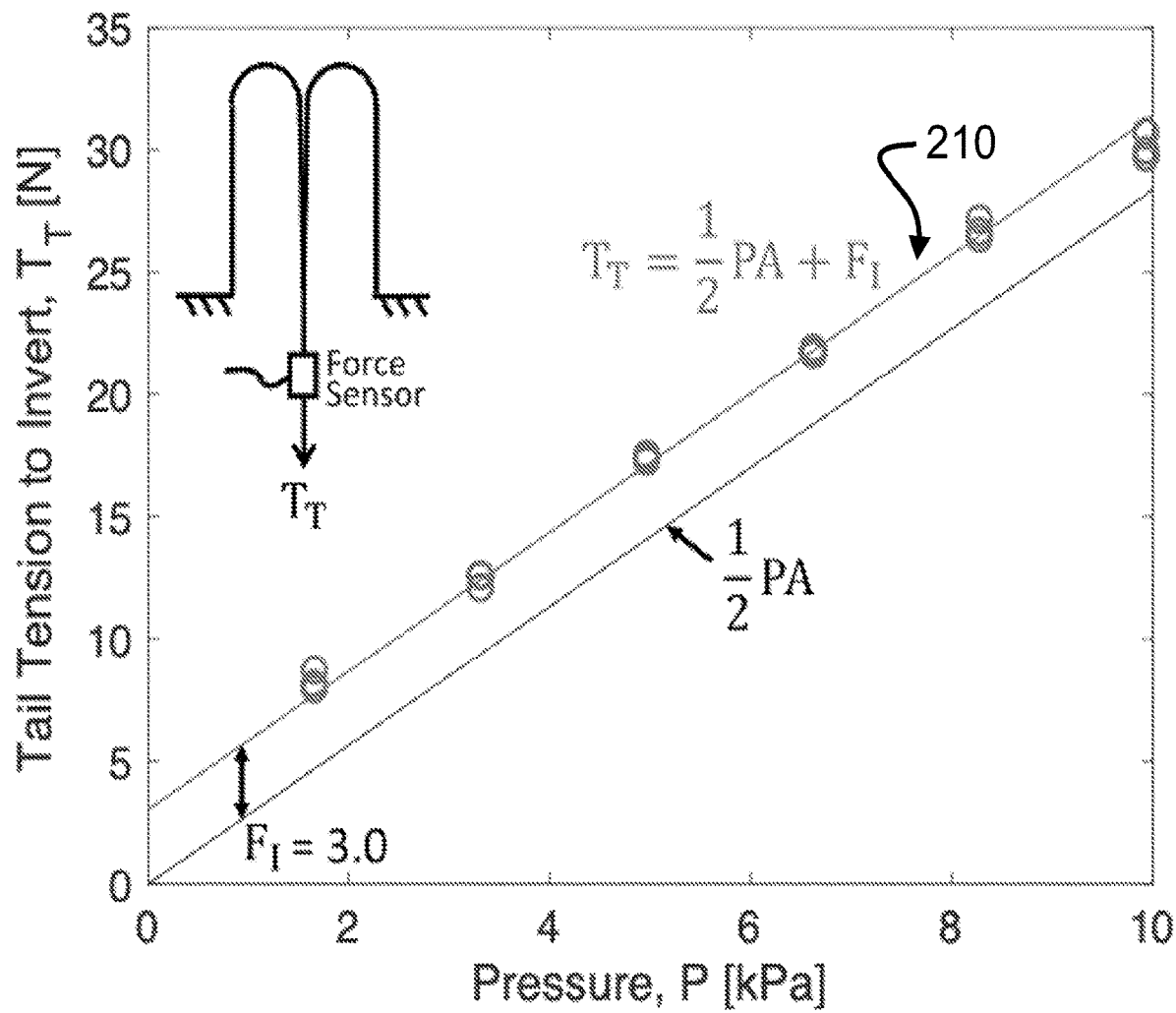
FIG. 2 shows according to an exemplary embodiment of the invention measured tail tension $T_T$ required to invert the soft robot body at various pressures. Data was taken using the experimental setup diagrammed in the top left, where a motor in the robot base retracts a straight soft robot body with a force sensor in line with the tail. Line 210 represents modeled tail tension, also shown in Equation 1. As predicted by the model, tail tension required to invert a given soft robot body increases linearly with pressure, with a slope equal to half of the cross-sectional area of the robot body, A/2, and a pressure-independent offset inversion force $F_1$ that likely depends on the material properties, diameter, and thickness of the robot body.

To validate this tail tension model, a force sensor (Nano17, ATI Industrial Automation, Apex, NC) was mounted in line with the tail and used a motor and spool in the base to invert a straight soft robot body at various lengths and pressures. FIG. 2 includes a diagram of the experimental setup. Data was taken throughout this paper using a low-density polyethylene (LDPE) soft robot body of inflated diameter 8.5 cm and thickness 74 µm. A closed-loop pressure controller was used to keep the pressure of the base and soft robot body constant during each trial. The base motor voltage was slowly increased until inversion began, and time-series force data was averaged during steady-state inversion to create a single data point for each initial condition. Data was taken at constant pressure at lengths between approximately 35 and 180 cm, and no length dependence of the tail tension to invert the robot was found. Additionally, data (FIG. 2) was taken for a robot between approximately 35 and 45 cm long at six pressures between 0 and 10 kPa, with three trials for each pressure. As predicted by the model, the tail tension to invert varies linearly with the pressure with a slope equal to half of the cross-sectional area of the soft robot body and an offset force. A best fit line was calculated for the data with the slope of the line constrained to A/2, yielding a value of 3.0 N for $F_I$.

Straight Robot Buckling Model

Figures 3A, 3B:
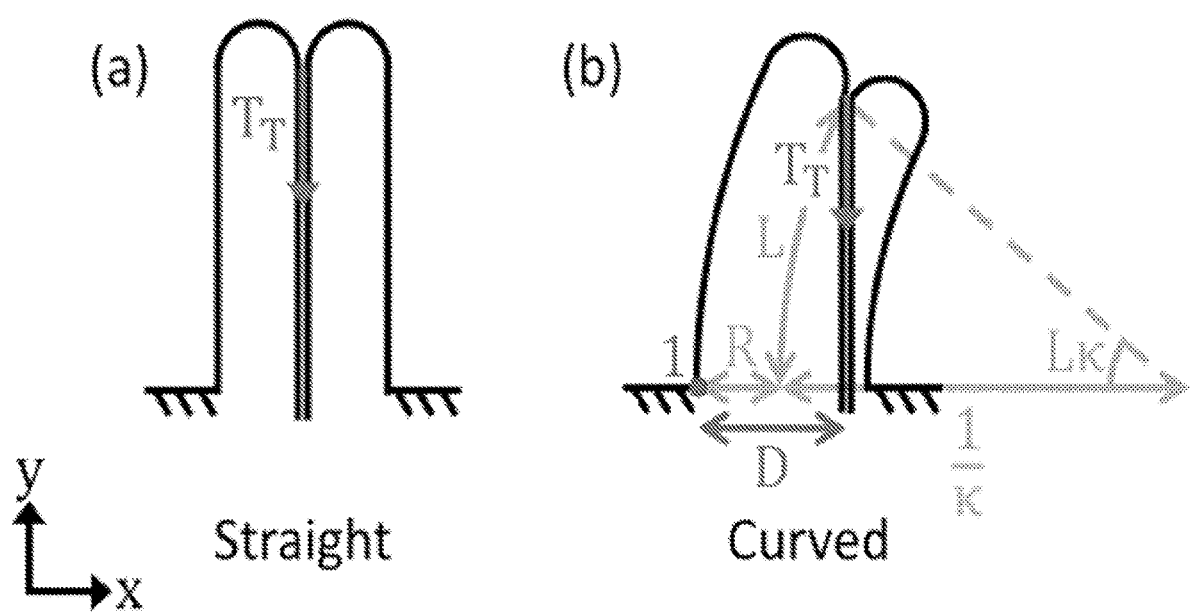
FIGS. 3A-B show according to an exemplary embodiment of the invention modeling of buckling due to tail tension $T_T$ for straight and curved robots.

To determine when a straight robot body will buckle due to the tail tension applied during retraction, we consider the wall to be an inflated beam on which the tail applies a force $T_T$ at the robot tip in the negative y direction (FIG. 3A). To calculate the force on the robot tip that would cause buckling, a model was used for axial buckling of an inflated beam:

$$F_{buckling} = \frac{E\pi^3 R^4 tP + EG\pi^3 R^3 t^2}{E\pi^2 R^2 t + RL^2 P + GtL^2}, \quad \text{Equation 2}$$

where E is the Young's modulus of the wall material, t is the thickness of the wall material, G is the shear modulus of the wall material, and L is the length of the soft robot body. Values of 300 MPa for E and 210 MPa for G were used. This buckling model is only valid when the wall is in tension. If the axial force on an inflated beam is larger than the force due to internal pressure that creates the tension in the wall, the inflated beam collapses due to crushing, with a crushing force of $$F_{crushing} = PA. \quad \text{Equation 3}$$

For a given pressure and length of straight robot body, if the tail tension required to invert the soft robot body is lower than both the axial buckling force and the axial crushing force, the robot will invert. Otherwise, the robot will buckle. Equating the tail tension to invert in Eqn. 1 with the crushing force in Eqn. 3 and solving for pressure, we find that, for any length robot body, inversion is impossible at a pressure lower than $$P_{min} = \frac{2F_I}{A}, \quad \text{Equation 4}$$

which for the robot material and dimensions is 1.1 kPa. Because the tail tension required to invert the robot does not have a length dependence but the buckling force decreases with length, for each pressure above the minimum inversion pressure, there will be a length below which the soft robot body will invert and above which it will buckle.

Curved Robot Buckling Model

Similar to the straight robot buckling model, for a constant curvature robot, the wall was considered to be a constant curvature inflated beam on which the tail applies a force $T_T$ at the robot tip in the negative y direction (FIG. 3B), and the tail tension was compared to invert the robot with the tail tension to buckle the robot. In this case, the tail does not necessarily pass through the center of the robot body at the base (the tail is free to move laterally within the base in the hardware implementation), so it may create a net moment on the robot body, allowing transverse buckling to occur.

For any shape of robot body that has a cross-sectional area of A at the base, the forces due to internal pressure apply a net moment on the wall about Point 1 of PAR in the positive z direction. The tail tension applies a moment on the wall about Point 1 of $T_T D$ in the negative z direction, where D is the moment arm of the tail tension force. Assuming the tail connects to the wall at the center of the robot tip, geometry was used to calculate $$D = R + \frac{1}{\kappa}(1 - \cos(L\kappa)), \quad \text{Equation 5}$$

where $\kappa$ is the curvature of the soft robot body and L is the arc length of the centerline of the robot body. Summing these moments and setting them equal to zero, the tail tension force required to buckle the curved robot body is $$F_{buckling} = \frac{PAR}{D} = \frac{PAR}{R + \frac{1}{\kappa}(1 - \cos(L\kappa))}. \quad \text{Equation 6}$$

This equation is only valid when the robot is not so curved or so long that the tail contacts the wall. However, the smallest moment arm (Dmin) that causes buckling for a given curvature occurs at a length where the tail is not contacting the wall. Dmin is calculated by equating the tail tension to invert in Equation 1 with the tail tension to buckle in Equation 6 and solving for D:

$$D_{min} = \frac{PAR}{\frac{1}{2}PA + F_I}. \quad \text{Equation 7}$$

One caveat to the treatment of straight and curved robots separately: If the curved robot buckling model gives a longer transition length from inversion to buckling than the straight robot buckling model would give for the same pressure (which might happen for an extremely low curvature robot), the robot should be modeled as straight to match reality.

Inversion and Buckling Data

Figure 4:
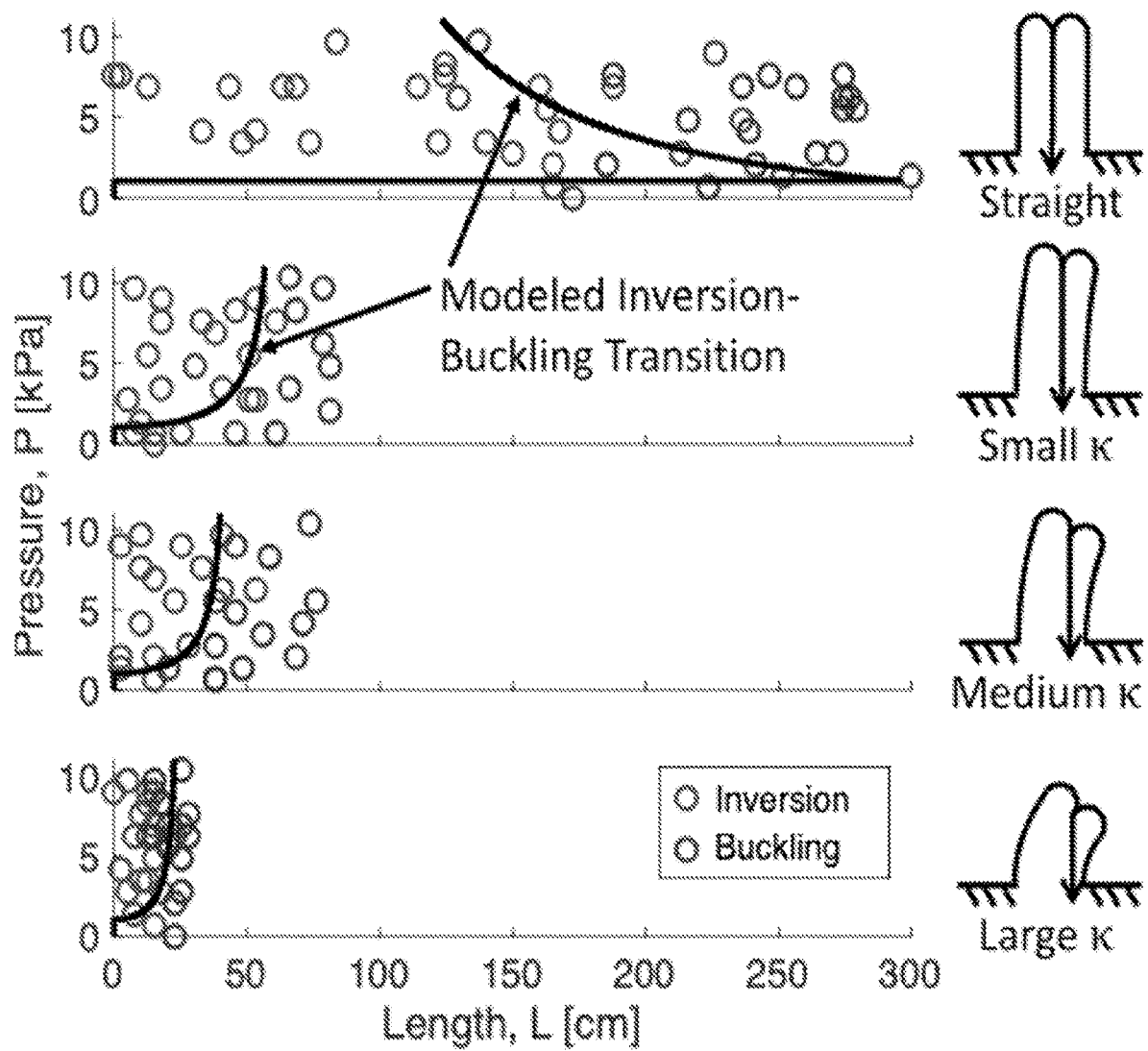
FIG. 4 shows according to an exemplary embodiment of the invention experimental data showing behavior during retraction from the base across a range of pressures and lengths for different initial robot curvatures. Lines show modeled transition points from inversion to buckling. As predicted by the model, the robot body inverts successfully at shorter lengths and buckles at longer lengths. Also, more curved robots buckle at shorter lengths than straighter robots. Curved robots tested have radii of curvature of 455 cm (small κ), 225 cm (medium κ), and 72 cm (large κ).

To validate the model, robots of four different curvatures at pressures between 0 and 10 kPa and lengths between 0 and 300 cm were experimentally retracted and observed whether they inverted or buckled. The curved robots were made by taping pinches in the wall at regular intervals, resulting in radii of curvature of 455 centimeters (small curvature), 225 cm (medium curvature) and 72 centimeters (large curvature). Data was taken after the robots had grown horizontally on a flat surface. FIG. 4 shows the results of this experiment, along with the modeled transition points between inversion and buckling. As predicted by the model, the robot body inverts successfully at short lengths and buckles at long lengths. Also, the more curved the robot body, the shorter the transition length from inversion to buckling.

Soft Growing Robot

An everting soft growing robot is created by starting with a tube of fluid-tight material that is flexible, but mostly inextensible (i.e. inextensible enough to evert rather than stretching when the robot body is pressurized). The tube is closed at both ends to create a closed pressure vessel, and the tube is folded inside of itself through a process called "inversion." The part of the tube that remains on the outside is herein referred to as the "wall" (also referred to as outside wall) and the part of the tube that is on the inside the "tail" (also referred to as inside wall). The part of the tube where the fold occurs is called the "tip" (also referred to as folded tip). When fluid pressure is applied inside the robot body, the robot lengthens from the tip, by pulling the tail material towards the tip and turning it inside-out through a process called "eversion," i.e. the opposite of inversion.

Retraction Device

The retraction device must sit inside the pressurized part of the robot body and apply forces between the robot tail and the robot tip. To place the retraction device inside the robot body, the robot body must be opened up and unfolded such that the robot tail can be passed between the rollers of the retraction device. Then, the robot body can be closed again.

The retraction device firmly grasps the robot tail and can move itself in either direction along the tail by running the motors in the rollers. If the retraction device is not at the robot tip, the device motors can be run to move the device towards the robot tip. Once the device reaches the robot tip, if the device motors continue to be run in the same direction, there is nowhere for the device to move, since it is constrained by running into the robot tip. Instead, it begins retracting the robot body while remaining at the robot tip.

While not necessary for the operation of the retraction device, to enable growth and retraction of long robots (i.e. those that have length change of 1000s of percent compared to their initial form factor), it is useful to store the tail material on a spool at the end of the robot opposite the tip (i.e. the "base"). The axle of the spool should be fixed at the base, and, to hold a large amount of material, it can be fixed inside a rigid pressure vessel that is larger than the robot diameter, with the end of the robot body material wall attached to the pressure vessel. During growth, the spool can unwind to let the tail material move toward the robot tip, and during retraction, the spool can wind up the tail material to remove any slack in the material. The operation of the spool and the retraction device should be synchronized to avoid slack or tension on the tail material, because too much slack can become knotted or get in the way of the wires passing to the retraction device, and too much force can cause the robot body to buckle uncontrollably.

Device Design

Based on the modeling and experimental characterization of buckling and inversion presented supra, a device was designed (FIGS. 6A-B) to prevent buckling during retraction at any robot length, pressure, and curvature. For the purpose of the device design, the key takeaways from the data and model were that at zero length, the soft robot body can retract without buckling at any curvature and any pressure above the minimum inversion pressure. The function of the device is to create an effective soft robot body length of zero for the purposes of retraction. The following explains the forces involved in the function of the retraction device, its implementation, and an analysis of some of the parameters important in the design.

Variations

Any device capable of applying sufficient force (i.e. enough to retract the robot) between the robot tail and the robot tip can function as a retraction device. The basic requirements for the device are (1) its ability to grasp the tail firmly enough to apply a retraction force, and (2) its ability to ground itself against the robot tip to provide a reaction force for the force on the tail while still allowing relative movement between itself and robot body material at the tip. Some possible variations on the retraction device design presented here include: (1) a device that uses passive rollers instead of a low friction ring to ground the device to the robot tip (FIGS. 11A-C), (2) a device that uses a different configuration of active rollers to grasp the tail (for example, using a single active roller with passive rollers placed around it, or using more than two active rollers to grasp the tail), (3) a device that grasps the tail at a fixed point while being grounded to the robot tip in a low friction way and actively lengthens the distance between the tip and the grounding point on the tail (for example, through a telescoping mechanism) to retract the robot, and (4) a device that uses at least two controllable graspers to alternately grasp and pull the tail away from the robot tip, while being grounded to the robot tip in a low friction way during the pulling motion. The first two variations function similarly to the device presented herein, with the small change of a different tip grounding mechanism or mechanism for attaching the active rollers to the tail. The third variation requires the retraction device to lengthen as it retracts the robot, thus inherently limiting the robot's length change based on how much the retraction device can lengthen. The fourth variation could be implemented in several different ways. One way uses a controllable grasper at the robot tip (for example, a ring that can actively increase and decrease in size) and a controllable grasper some distance from the robot tip. These two graspers are connected via a mechanism that can lengthen and shorten the distance between the two graspers. To retract the robot, this mechanism moves in an inchworm-like motion where it first loosens the grasper at the robot tip and tightens the grasper away from the tip; then, it increases the length between the two graspers to retract the robot. Then, it tightens the grasper at the robot tip and loosens the grasper away from the tip. Finally, it shortens the length between the two graspers to reset itself and begin the retraction motion sequence again.

Working Principle

Figure 6A:
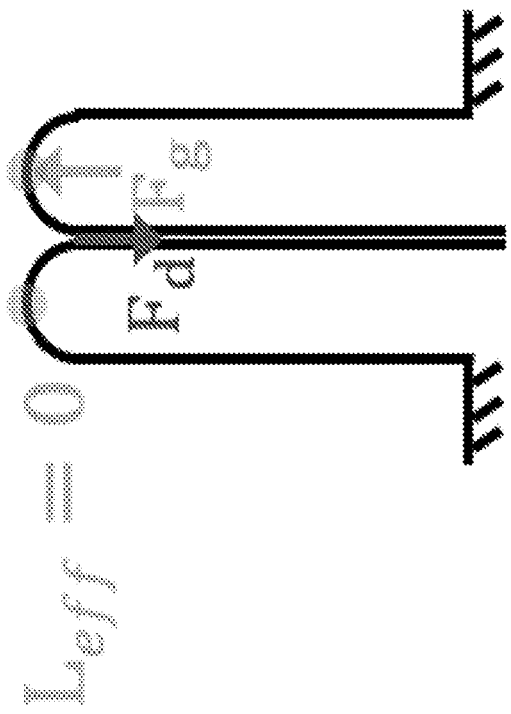
FIG. 6A shows the working principle for the retraction device where the objective is to make the effective robot length zero for retraction, applying force on the tail (also referred to as inside wall) while grounded to the robot tip. If instead, force is applied on the tail from the robot base (as shown on the left side), the entire robot body length is susceptible to buckling due to retraction forces. By grounding itself to the robot tip (as shown on the right side), the retraction device makes none of the robot length susceptible to buckling due to retraction forces.
Figure 6A:
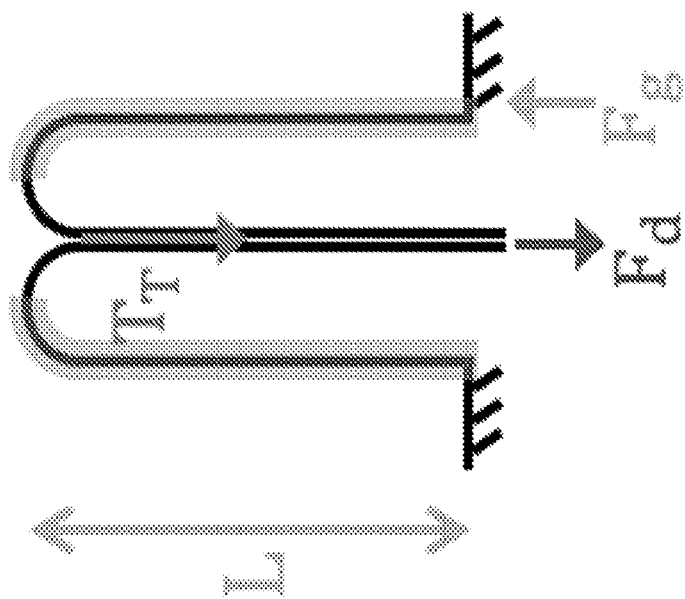
Figure 6B:
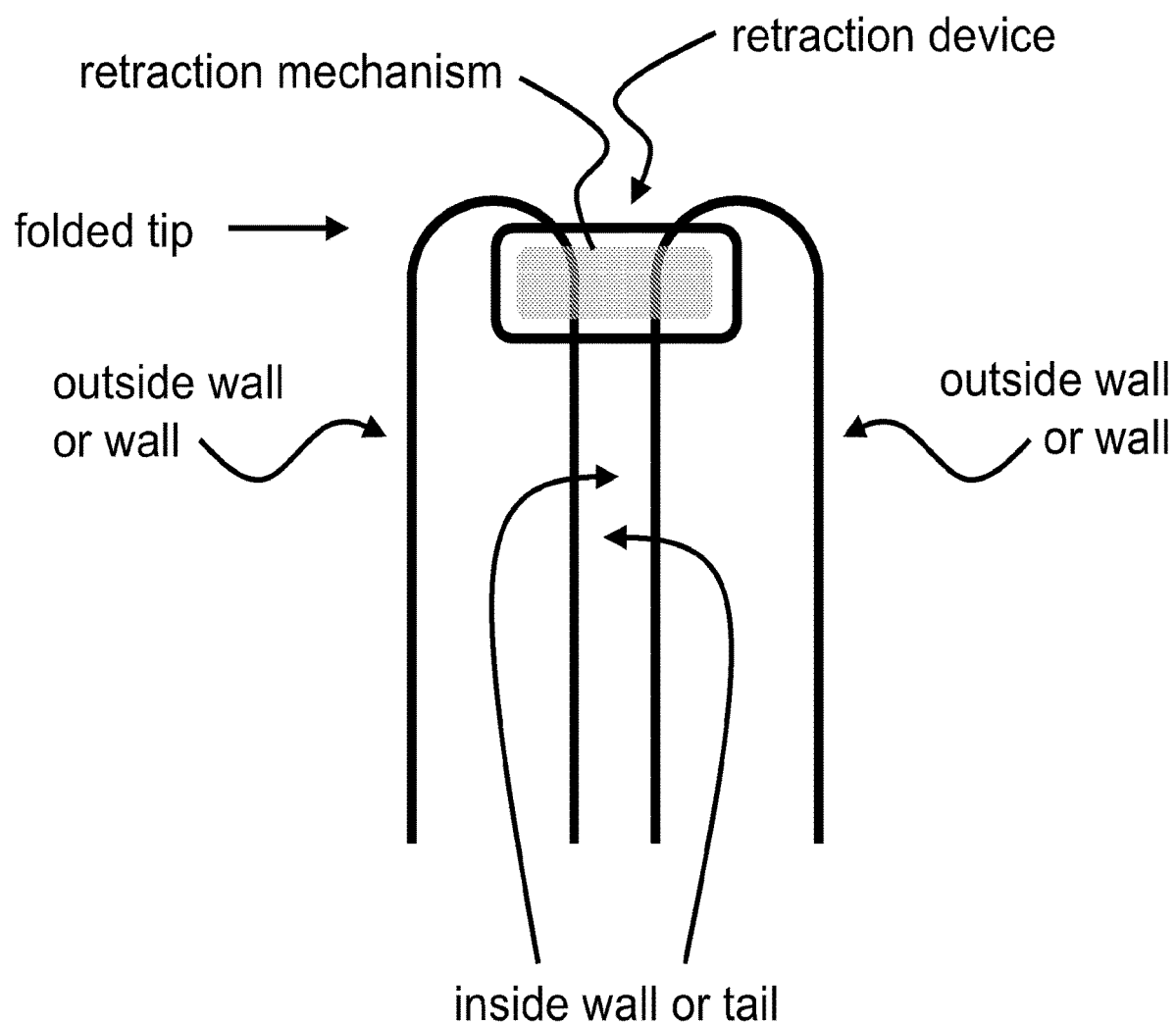
FIG. 6B shows according to an exemplary embodiment of the invention a schematic of the flexible robot, the retraction device and the retraction mechanism as well as the definitions of the inside wall or tail, outside wall or wall, and folded tip or tip.

To apply a force to retract the soft robot body using the motor in the base, the motor and spool assembly applies the force on the tail and is grounded to the base, thus making the effective soft robot body length for the purpose of retraction the entire distance from base to tip. The distinguishing feature of the device is that it applies the force to retract the soft robot body on the tail while being grounded to the robot tip, thus making the effective length of the robot zero for the purpose of retraction (FIG. 6A).

Forces without Device

Figure 5:
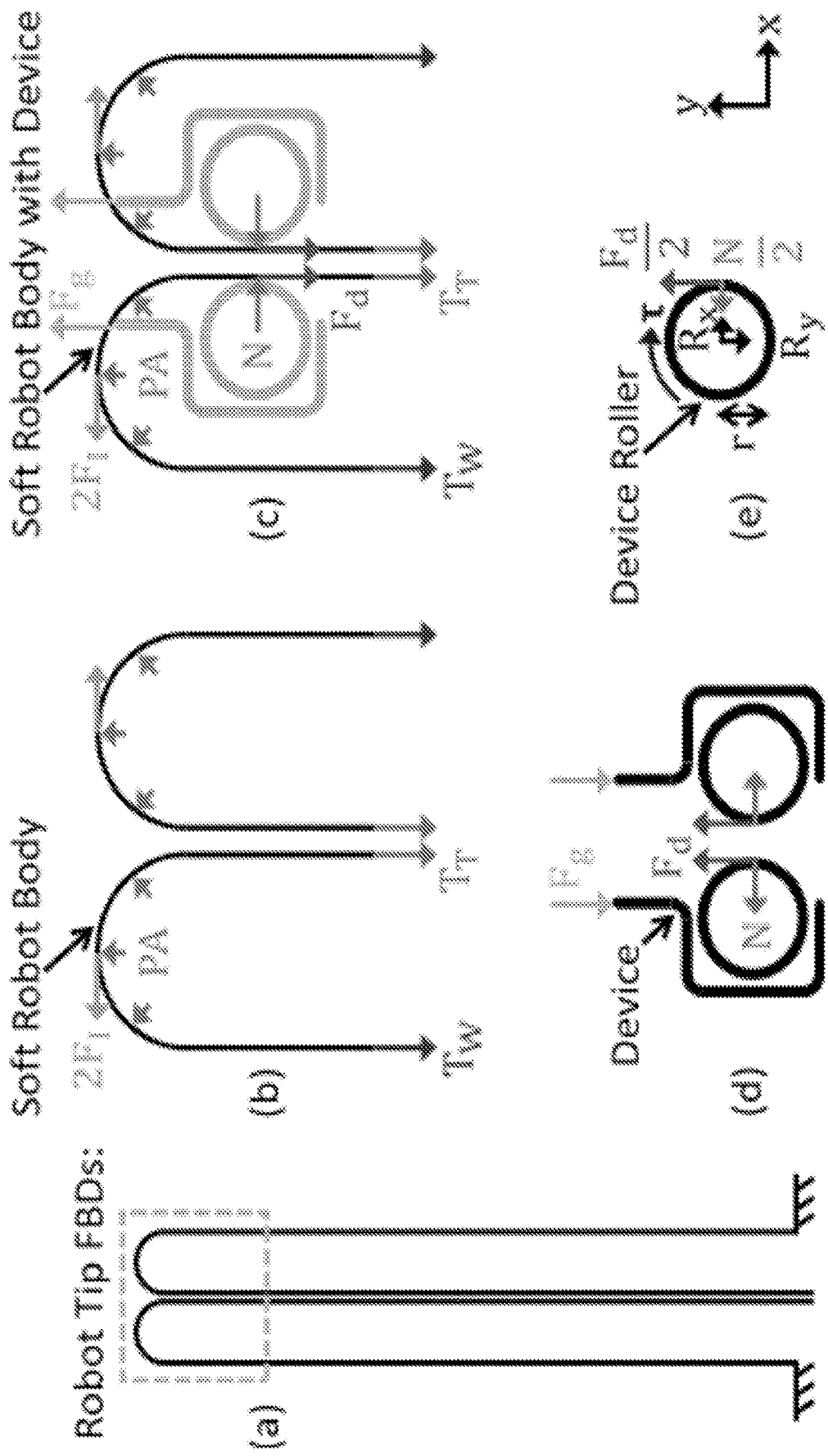
FIGS. 5A-E show according to an exemplary embodiment of the invention free body diagrams (FBDs) showing the forces involved in inversion of the soft robot body with and without our retraction device.

FIGS. 5A-E show free body diagrams relevant to the function of our retraction device. As shown in FIG. 5A, all of the free body diagrams are drawn at the tip of the robot, and they denote quasistatic forces during inversion. The first free body diagram (FIG. 5B) shows the forces on the soft robot body during inversion without the device. Tension in the wall $T_W$ and tension in the tail $T_T$ both act in the negative y direction. Pressure acts in all directions pointing outward from the inside of the soft robot body and producing a net force on the soft robot body of magnitude PA in the positive y direction. Additionally, an offset inversion force $F_I$ (here multiplied by 2 to make the equations from force balance match equation 1 is drawn pointing radially outward along the tip material perpendicular to the y axis. Summing the forces on the soft robot body in the y direction, one has $$PA - T_W - T_T = 0. \qquad \text{Equation 8}$$

Performing a tension balance along the soft robot body from wall to tail, one has $$T_W + 2F_I - T_T = 0. \qquad \text{Equation 9}$$

Solving equations 8 and 9 for $T_T$, one gets equation 1.

Forces with Device

FIG. 5C shows the free body diagram for the soft robot body during inversion when the device is exerting forces at the tip. Three additional forces are created by the device. First is the device's force $F_d$ on the tail, which adds to the tail tension in the negative y direction. Second is the device's grounding force $F_g$ applied on the tip in the positive y direction. Third is a normal force N inward on the tail in the x direction, which arises because our particular device implementation (described infra) uses rollers that squeeze the tail and use friction to apply the device force. Here, $2F_I$ is the force required to invert the soft robot body at zero pressure through the device. Summing the forces on the soft robot body in the y direction now yields $$PA - T_W - T_T + F_g - F_d = 0, \qquad \text{Equation 10}$$

and a tension balance along the soft robot body results in $$T_W + 2F_I - T_T - F_d = 0. \qquad \text{Equation 11}$$

Additionally, using the free body diagram of the device shown in FIG. 5D, the forces in the y direction are summed to see that the device and grounding forces are equal:

$$F_d - F_g = 0. \qquad \text{Equation 12}$$

Solving equations 10-12 for $T_T$, one has $$T_T = \tfrac{1}{2} PA + F_I - \tfrac{1}{2} F_d, \qquad \text{Equation 13}$$

which indicates that the tail tension and the device force work together to balance the internal pressure and inversion force. If the device force increases, the tail tension necessary to invert the robot decreases. If the device applies enough force, one can invert the robot without needing to apply any tail tension force, thus making buckling due to retraction impossible. Plugging $T_T = 0$ into equation 13, one solves the device force required to invert the robot with zero tail tension:

$$F_d = PA + 2F_I. \qquad \text{Equation 14}$$

Forces on Device Rollers

FIG. 5E shows the free body diagram of one of the two rollers in the device. The device was implemented using a pair of motor-driven rollers that grip the tail using friction. The left roller (with radius r) experiences a torque $\tau$ in the negative z direction, as well as half of the device force in the positive y direction and half of the normal force in the negative x direction. Additionally, it is supported by the device housing with reaction forces Rx and Ry applied at the center of the roller. Summing the moments on the roller in the positive z direction about the center of the roller, one has $$\tfrac{1}{2} F_d r - \tau = 0, \qquad \text{Equation 15}$$

which results in $$F_d = \frac{2\tau}{r} \leq \frac{2\tau_{max}}{r}, \qquad \text{Equation 16}$$

where $\tau_{max}$ denotes the maximum possible torque applied by the motor. Because the device force is applied using friction between the rollers and the tail (with coefficient of static friction $\mu_s$), one can also write $$F_d \leq \mu_s N. \qquad \text{Equation 17}$$

Based on equations 16 and 17, the amount of force that the device can apply is limited by the amount of torque that each motor can provide, as well as the friction coefficient and normal force between the rollers and the tail.

Implementation

Figure 6C:
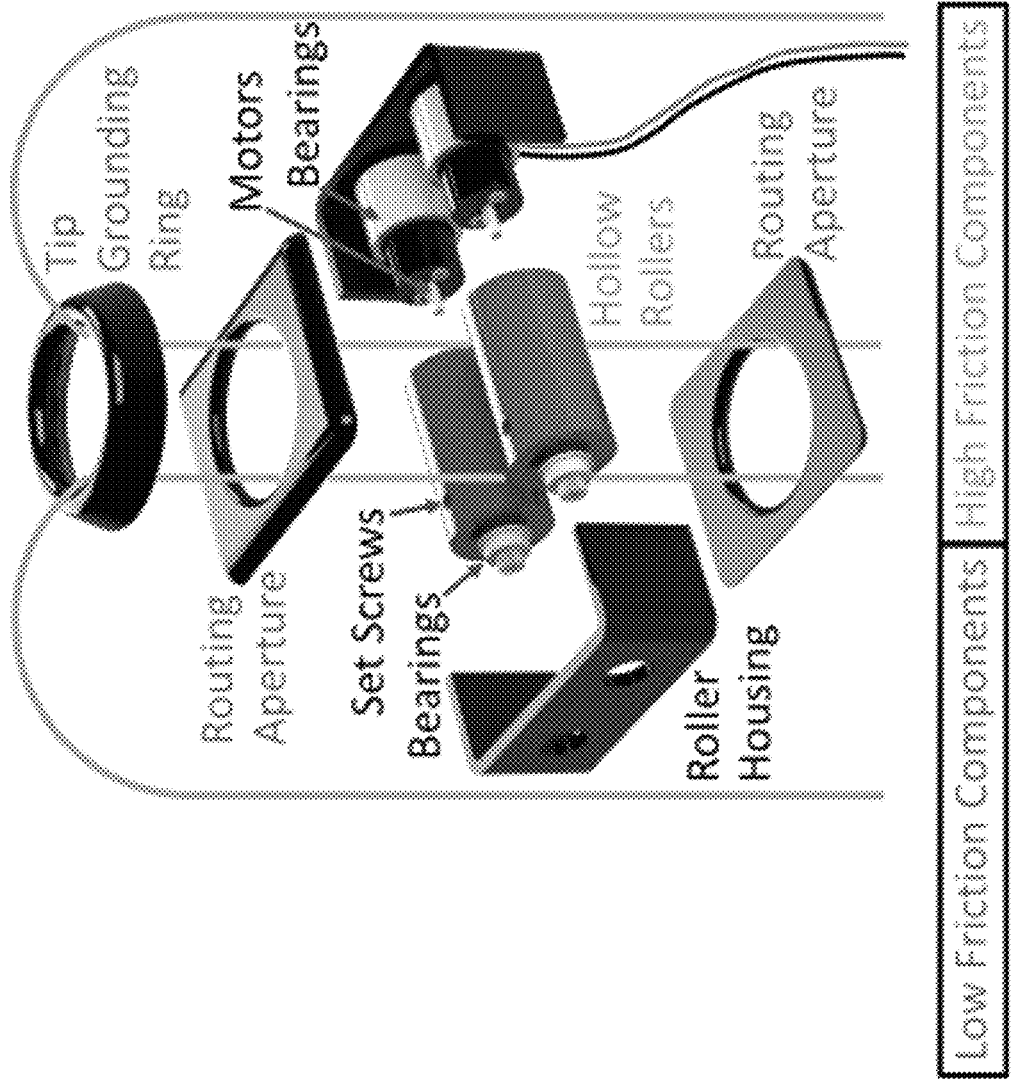
FIG. 6C shows according to an exemplary embodiment of the invention the implementation of the retraction device. The device is grounded to the tip of the soft robot body using a ring coated in low friction tape. It applies the force to invert the robot using a pair of rollers driven by motors and coated in high friction material. The soft robot body material is routed into the rollers using two routing apertures: one toward the robot tip and one toward the robot base. The motor wires run the length of the soft body. Low friction components: Routing Aperture, Tip Grounding Ring and Routing Aperture. High friction component: Hollow Rollers. The rollers should be high enough friction to be able to apply the necessary force on the tail to retract the robot without beginning to slip relative to the tail. The routing apertures and tip grounding ring should be low enough friction to not make sliding of the robot body material over their surface impossible given the available motor torque.

An implementation of the retraction device is shown in FIG. 6C. In this embodiment, two motors (3070, Pololu Corporation, Las Vegas, NV) were mounted to one half of the 3D-printed roller housing so that the motor shafts protrude from holes in the housing. Two 3D-printed rollers fit over the motor housing and are rigidly connected to the motor shafts. The rollers roll on needle roller bearings mounted on the motor housing at one end and connect to the other half of the roller housing via ball bearings. The motor wires run all the way through the soft robot body from the device to the base and through an airtight feedthrough in the wall of the base to the power supply. The rollers are coated in a high-friction material (Non-Slip Reel, Dycem Corporation, Bristol, UK) to increase the device force that can be applied without slipping (Equation 17).

In the implementation, the friction force between the rollers and the soft robot body is high enough that the motor torque in equation 16 is the limiting factor in determining the force the device is capable of exerting on the tail. Based on the maximum continuous torque of the motors (24.5 N-cm) and the roller radius (1.2 cm), the theoretical maximum device force is 41 N, which corresponds to retracting the soft robot body with zero tail tension at any pressure up to 6.2 kPa (Equation 14). Realistically, there are torque losses in the transmission of the motor torque through the rollers, and the value of F increases due to the device (see the infra), so the maximum pressure at which this device can retract the robot on its own is closer to 2 kPa. The maximum motor speed is 33 RPM, which corresponds to a retraction speed for the tip of 2.1 cm/s.

To prevent the tail from wedging itself between the edges of the rollers and the motor housing, two 3D-printed routing apertures with circular cutouts are attached to the top and bottom of the roller housing. These apertures are coated with ultra-low-friction tape (6305A16, McMaster-Carr Supply Company, Elmhurst, IL) to ease sliding of the tail through the apertures. Finally, to smooth the surface that contacts the robot tip, a 3D-printed circular tip grounding ring coated in low friction tape is attached to the top routing aperture.

In the designs, the inventors attempted to minimize the size and weight of the device given the motors used. The device measures approximately 6.3 cm by 5.0 cm by 4.4 cm and weighs 106 g. The smallest diameter soft robot body that this version of the device can fit inside is approximately 8.1 cm in diameter. Note that, because the device only needs to contact the tail and the tip of the soft robot body, not the wall, the same device can invert soft robot bodies of much larger diameter.

During retraction of long robots using the device, tail material builds up between the robot tip and the robot base, so the motor in the base must be used to take up the slack. The force required from the base motor to take up the slack in the tail can be calculated using and is two orders of magnitude smaller than the force required without the device.

Device Aperture Size Analysis

Figure 7:
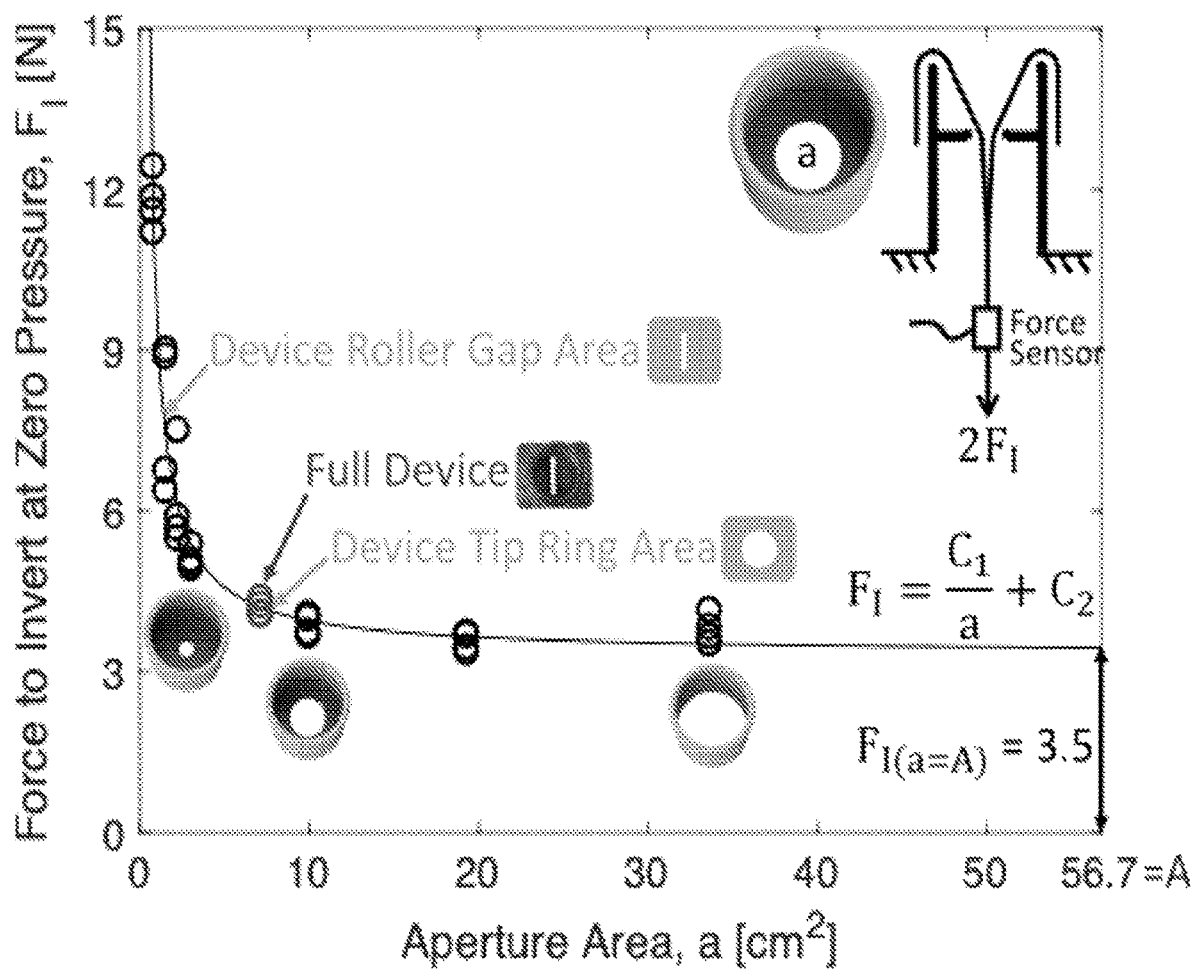
FIG. 7 shows according to an exemplary embodiment of the invention measured force to invert the soft robot body at zero pressure through various circular apertures coated in low friction tape and through our retraction device. Apertures were held fixed and an uninflated soft robot body was manually pulled through each aperture with a force sensor in line with the tail. For circular apertures, force varies with the inverse of aperture area, and at an aperture area equal to the cross-sectional area of the soft robot body, the force is approximately equal to the offset from FIG. 2. For non-circular apertures, force/area data points fall close to the same curve (data not shown). The black line represents the resulting model of force to invert and is also presented in equation 18. Interestingly, the force to invert through our retraction device is approximately equal to the expected force to invert through a circular aperture with the area of the inside of its tip grounding ring and is much lower than the expected force to invert through a circular aperture with the area of the gap between the rollers.

One of the most important aspects of device geometry is the area of the smallest aperture through which the tail must slide during inversion through the device. To quantify the effect of this parameter, the force required to invert the soft robot body through various apertures at zero pressure was measured. FIG. 7 includes a diagram of the experimental setup. The setup is almost the same as that described supra, except that the wall of the soft robot body is free to move and is not fixed to the base. Instead, a 3D-printed cylinder with a circular aperture inside is held fixed, and a soft robot body is manually pulled through the cylinder with the Nano17 force sensor in line with the tail. In this case, since the wall is free to move, the measured force is $2F_I$. Seven different circular aperture sizes were investigated, with four trials for each aperture size. The maximum measured force for each trial was recorded as that trial's data point. Based on the data, we formed a descriptive model of the dependence of $F_I$ on aperture area a:

$$F_I = \frac{C_1}{a} + C_2,  \quad \text{Equation 18}$$

where $C_1$ and $C_2$ were determined using a best fit curve as 6.1 N-cm$^2$ and 3.3 N, respectively. Thus, the force to invert through a given circular aperture varies inversely with aperture area.

The experiment was repeated with the retraction device in place of the circular apertures. The force to invert through the device is approximately the same as the extrapolated force to invert through an aperture the size of the device's tip grounding ring (a 3.2 cm diameter circle) and significantly lower than the force to invert through a circular aperture the size of the rectangular gap between the rollers (0.5 cm×3.2 cm). This indicates that, since the rollers roll along the tail, rather than making the tail slide through them, the force to invert through the device does not depend on the roller spacing but only on the smaller of the areas of the routing aperture and the inside of the tip grounding ring. According to the data, as long as the area of the smallest sliding aperture in the device is larger than approximately 5 cm$^2$, the force to invert through the device is minimal.

Working Examples

Exemplary capabilities were tested through comparison of behaviors with and without the device.

Exploring a Forking Path

Figure 8:
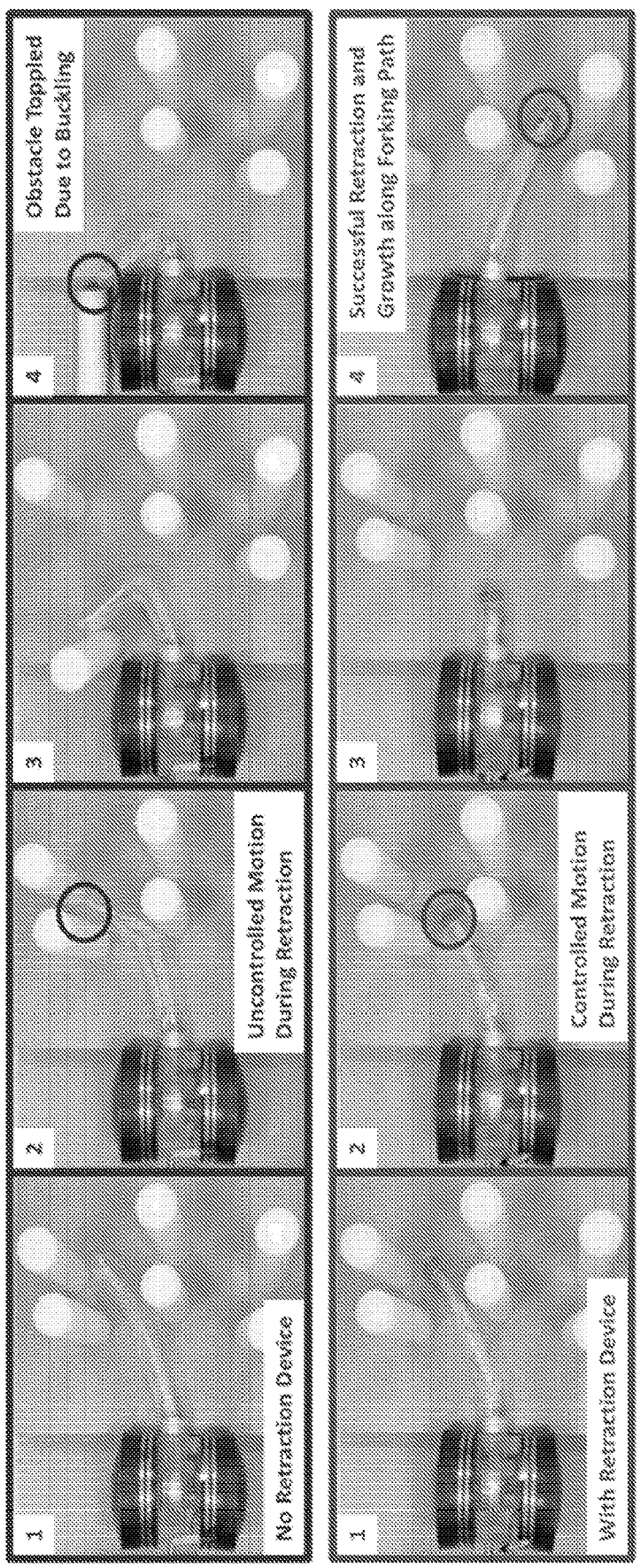
FIG. 8 shows according to an exemplary embodiment of the invention controllably reversing growth after exploring one fork of a path to grow down another fork. The top time sequence shows that without the device, control of the tip position of the robot during retraction is impossible, leading to undesired environment contact and toppling one of the obstacles. The bottom sequence shows that with the device, the robot successfully navigates the forking path without moving any of the obstacles.

One capability for pneumatically everting soft robots is controlled position during retraction. A demonstration of this capability is shown in FIG. 8, where sequential exploration of two different portions of a forking path is attempted. For this example, the soft robot body was steered in one degree of freedom (left/right) by pulling on a pair of cables, one on the left and one on the right side of the soft robot body, running through a pair of tubular LDPE pockets taped along the entire length of the body. Both with and without the device, the soft robot body can be steered down one section of the forking path during growth. However, when retraction is attempted without the device (FIG. 8 top) by pulling on the tail using the motor and spool in the base, the soft robot body buckles, and control of tip position during retraction is impossible. This results in one of the obstacles being toppled. In contrast, when retraction is attempted with the device applying the necessary force to invert at the robot tip (FIG. 8, bottom), the robot tip's position can be completely controlled during retraction as well as growth, and the forking path can be successfully navigated without contacting any of the obstacles.

Navigating a Delicate Environment

Figure 9:
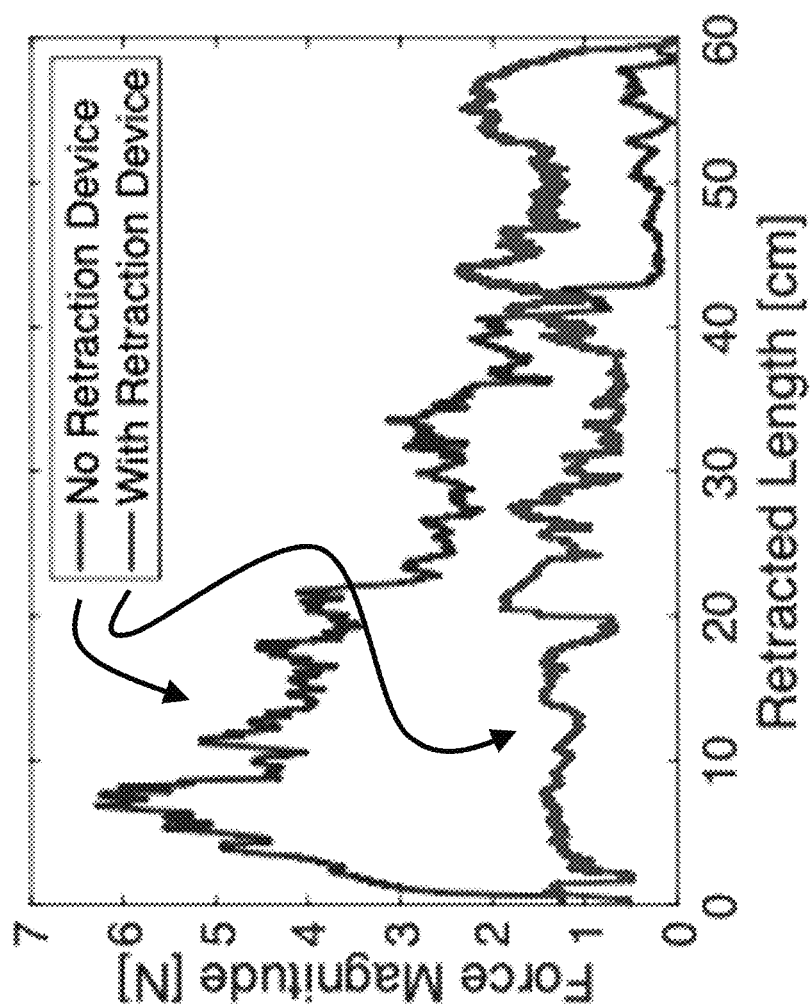
FIG. 9 shows according to an exemplary embodiment of the invention retracting without exerting forces on the environment. Without the device, control of the force exerted on the environment is impossible, since the robot body braces itself against the environment to prevent buckling. With the device, the force exerted on the environment is much reduced and does not depend on the curvature or curved length of the robot body.

A second capability is controlled force during retraction. This capability is shown in FIG. 9, where retraction is attempted after growing through a curved path. Here, the soft robot body grows inside an approximately 9 cm inner diameter cylindrical tube with two bends and with the top cut off so that the robot is visible from the top. The soft robot body is preformed to match the shape of the tube by pinching the wall at two points and taping over each pinch. A Nano17 force sensor is mounted between the floor and the bottom of the tube and is the only connection point between the floor and the tube. During growth with and without the device, the force applied on the tube is minimal. During retraction with the device, the magnitude of the force applied on the tube in the plane of the curve is significantly lower than without the device (both at 1.4 kPa), and it does not depend on the robot length or curvature. Since the soft robot body would not buckle in free space during retraction with the device, it should not require support from the environment to avoid buckling. The measured force shown with the device is greater than zero likely due to imperfect alignment between the soft robot body and the tube.

Environment Sampling

Figure 10:
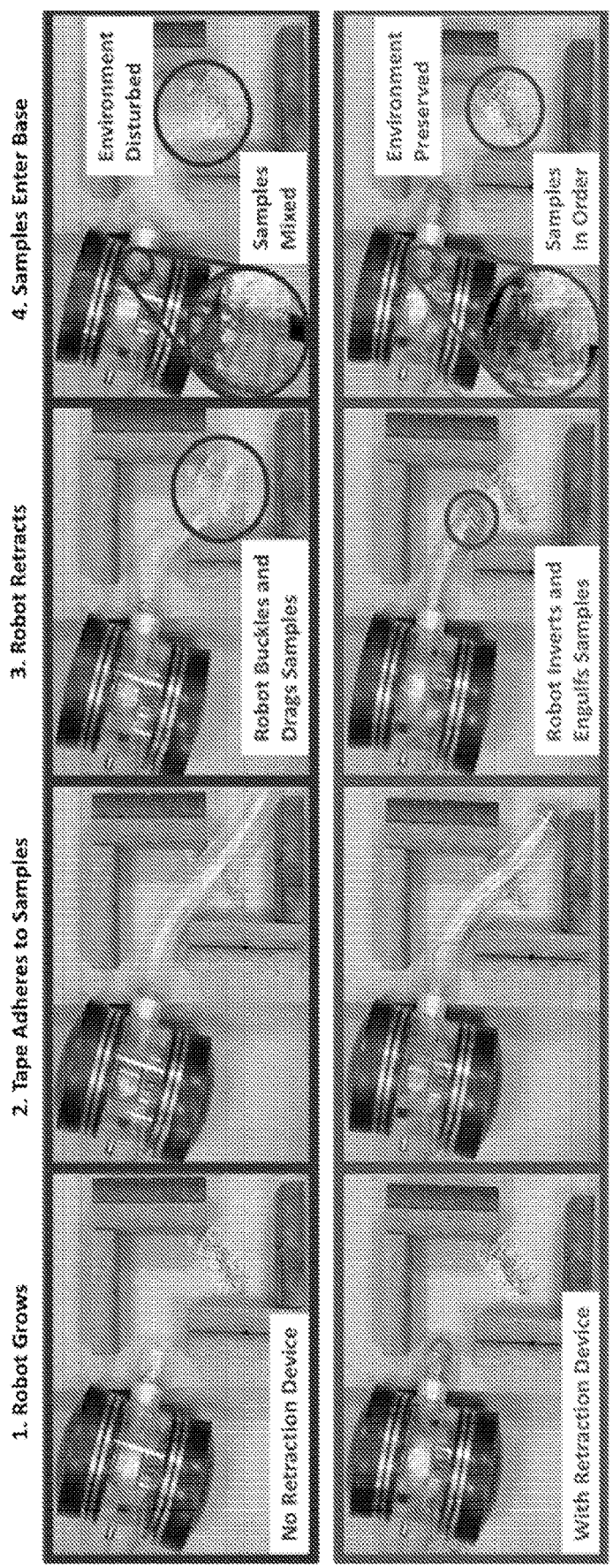
FIG. 10 shows according to an exemplary embodiment of the invention growing over an environment and taking samples of the soil by engulfing them during retraction without disturbing the environment. The robot body has a layer of tape on the bottom to adhere to the samples. The top time sequence shows that without the device, the buckled robot body disturbs the environment and mixes up the samples (green, pink, and blue confetti) that are brought back to the base. The bottom sequence shows that with the device, the samples are brought back with an inherent record of how far along the robot they were found.

A third capability made possible by the retraction device is environment sampling. This capability combines two features of pneumatically everting soft robots: the ability to grow and retract over an environment without relative movement between the soft robot body wall and the environment, and the ability to grasp and store objects by engulfing them during inversion. As shown in FIG. 10, when tape is placed along the bottom of the soft robot body, it can stick to the environment as it grows, and the soft robot body can pick up samples of the material (green, pink, and blue confetti here) that then become packaged within the tail during inversion of the robot. The top of the figure shows that the environment is disturbed and the samples are mixed when this behavior is attempted without the device. The bottom of the figure shows that this sampling capability can be executed cleanly with our retraction device, where the soft robot body grows over the environment, retrieves the samples, and brings them back to the base.

Tip Mount

In an additional embodiment, the device could employ a rolling interlock where the outer cap hooks around the inner retraction device so that the two pieces cannot physically be separated without breaking. Each piece has passive rollers at the connection point so that the material of the soft robot body wall can pass between them in a low friction manner. While this tip mount does not have a physical connection back to the base like a string mount, and outer cap with reel mount, it can transmit significant forces through the rolling interlock, which is grounded to the robot tip using the retraction device. These forces hold the mount at the robot tip and allow significant pulling forces to be transmitted to the environment: from the base, along the robot body, and then through the mount.

Figure 11A:
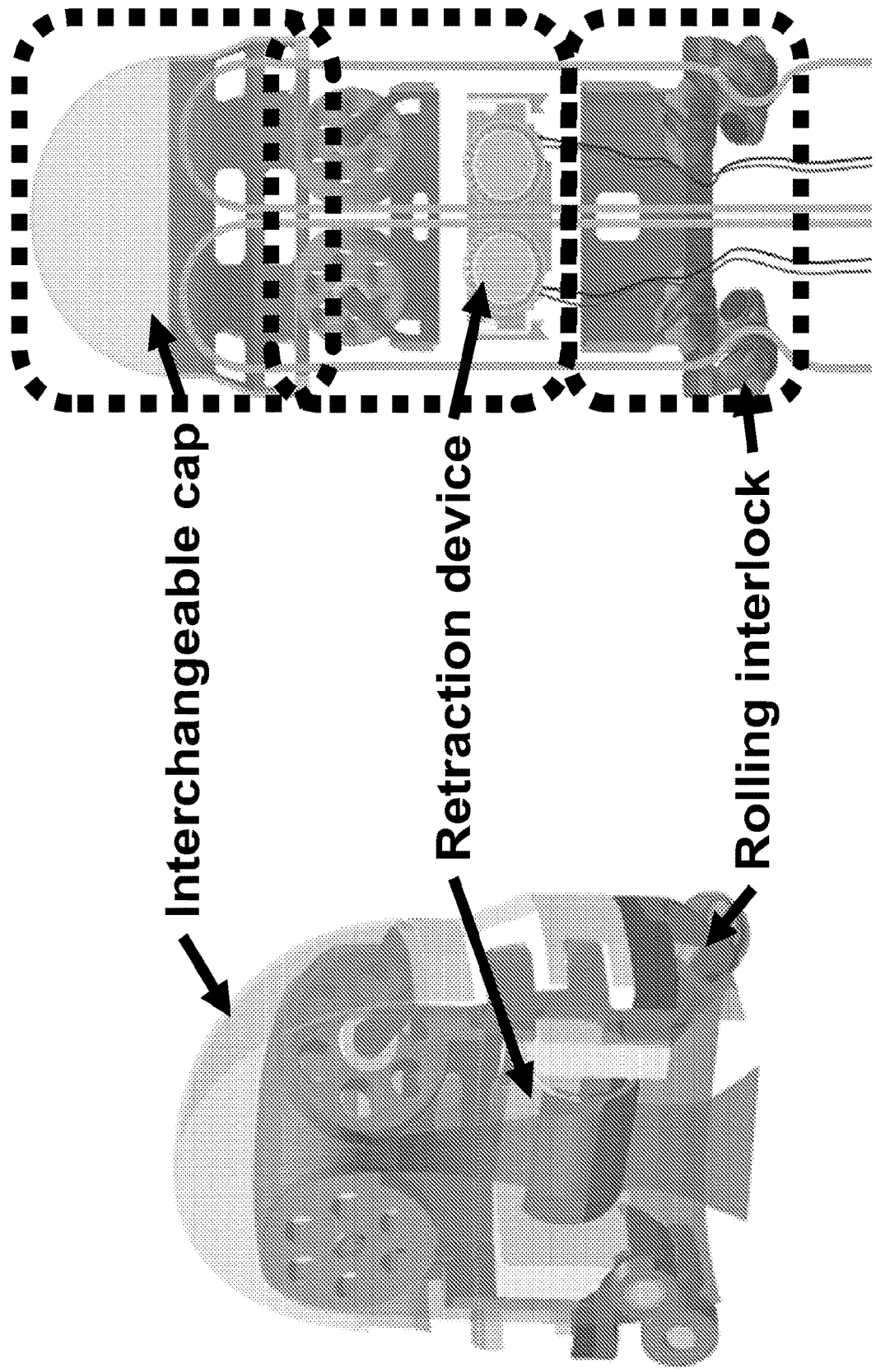
FIGS. 11A-C show according to an exemplary embodiment of the invention a tip mount design that uses the retraction device as a basis for mounting of a cap outside the tip.
Figure 11B:
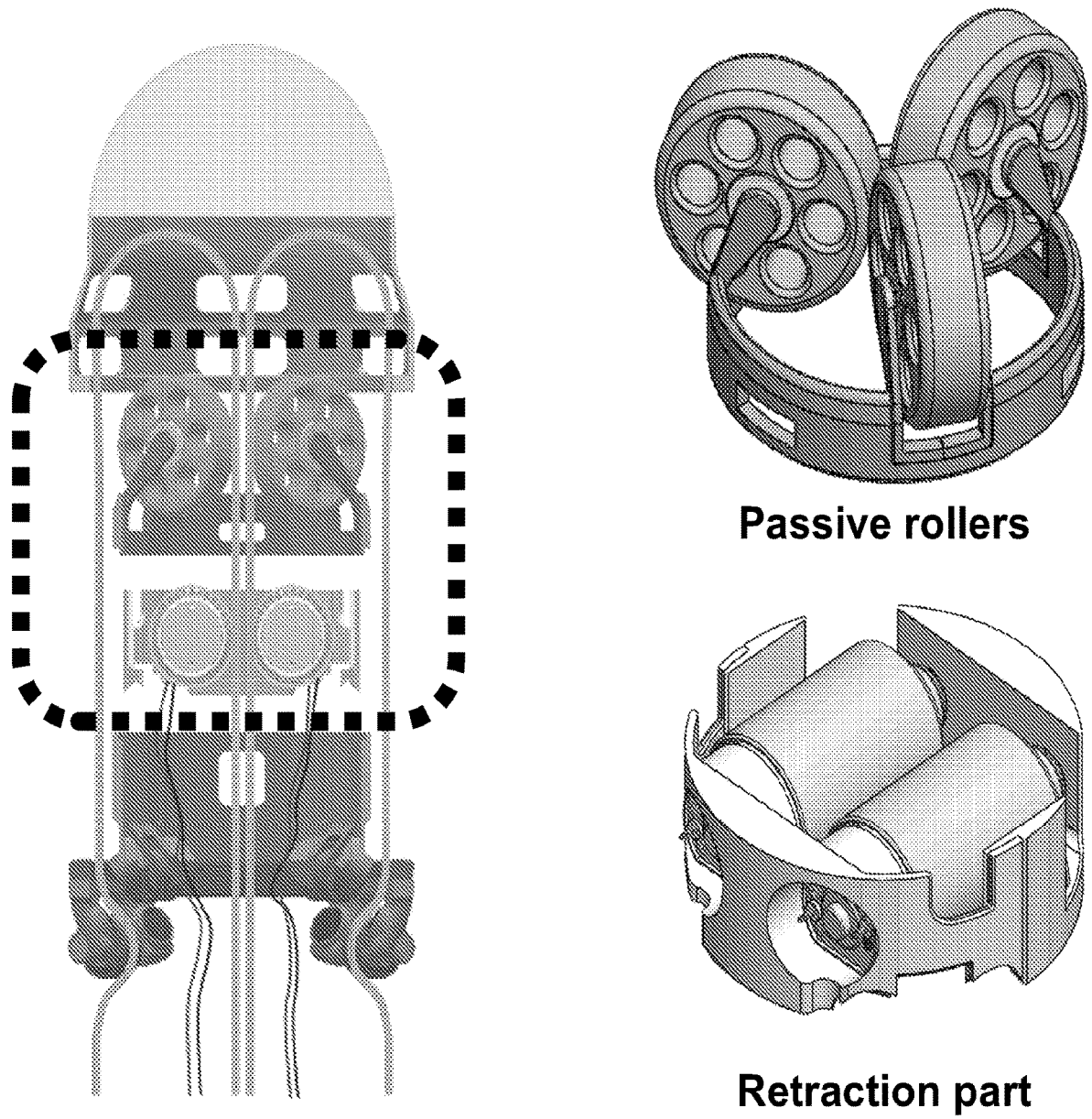
Figure 11C:
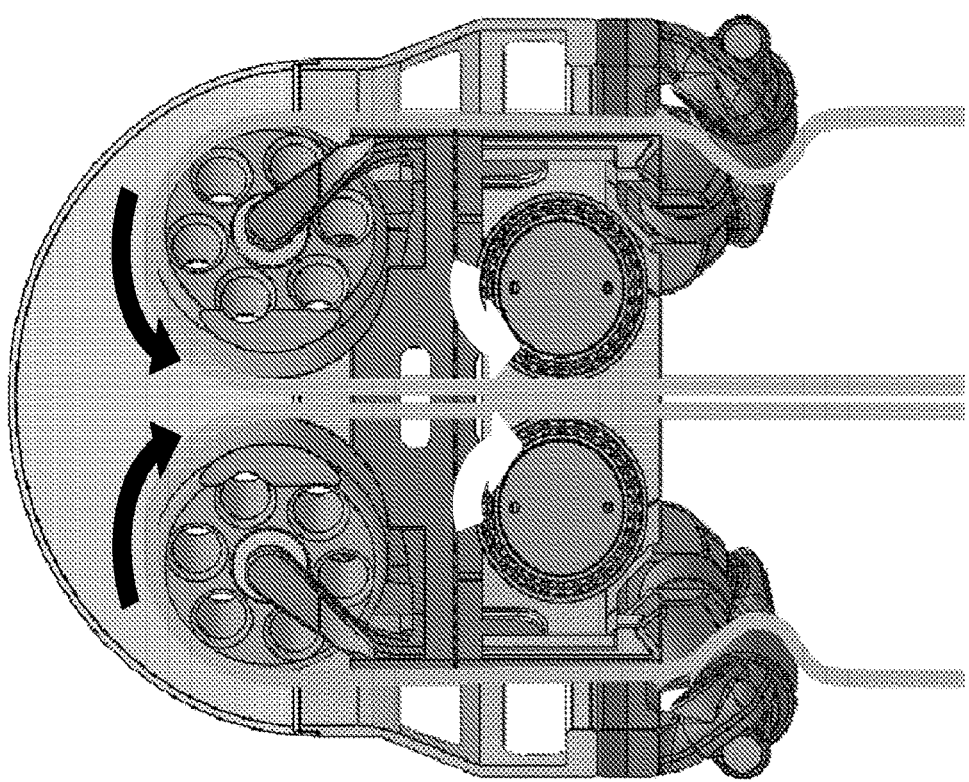
Figure 11C:
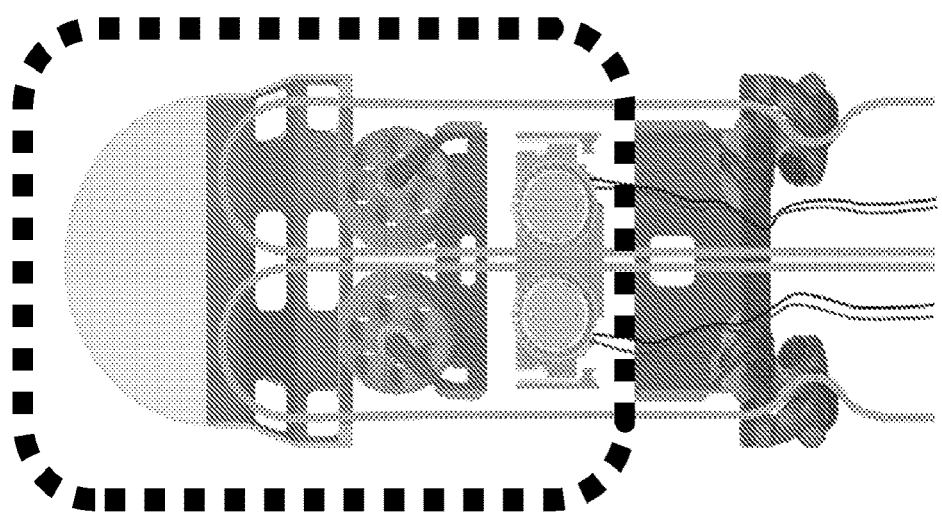

An example of such a tip mount design is shown in FIGS. 11A-C which has three main components: (1) an outer cap for mounting, (2) a retraction device to allow retraction without buckling, and (3) a rolling interlock to attach them together.

The (interchangeable) outer cap (FIG. 11A) provides a mounting location for sensors and tools and a place for the robot body to push on and propel the tip mount forward. The outer cap design should not impede the function of the steering actuators used to direct the tip of the robot. In this implementation, three series pouch motor steering actuators were used, which shorten when pressurized and are attached circumferentially around the robot body, so three cutouts in the cap were added to give the actuators room to inflate and deflate without affecting the fit on the robot body. The retraction device is shown in (FIGS. 11A-C) with motors and a different tip grounding mechanism. During retraction, two motors (3485, Pololu Corporation, Las Vegas, NV) drive rollers coated in high friction material (Non-Slip Reel, Dycem Corporation, Bristol, UK) that squeeze the tail material and pull it toward the base were used. Three passive rollers at the top of the device apply a reaction force to the robot tip while allowing the material to move easily around the tip. During growth, the active rollers are driven to move tail material towards the robot tip, and the material pushes on the outer cap instead of contacting the passive rollers. Aside from the high friction material coating the actively driven rollers, all other parts are designed to reduce unnecessary friction with the soft robot body material. The rolling interlock (FIG. 11B) has three matching sets of roller-magnet units, placed circumferentially around the base of the outer cap and the base of the retraction device, such that the series pouch motors lie in between. Each roller-magnet unit has a passive roller with a disk-shaped magnet on either side. Only the rollers contact the wall material, which must slide between the pairs of disk-shaped magnets (separated by a small space) as the robot grows or retracts. The rollers can transmit high forces across the membrane, and the magnets prevent relative tilting or rotation (and thus separation) between the outer cap and retraction device. Separate rollers and magnets can be used, as opposed to magnetic rollers, since disk magnets can provide higher magnetic force.

The invention claimed is:

1. A system for controlling a flexible robot, comprising:
    (a) a double walled flexible tubular robot with an inside wall, an outside wall, and a folded tip; and
    (b) a retraction device located centrally at the folded tip and grounded to the flexible robot itself and not an external environment, whereby the outside wall encloses the retraction device, and wherein the retraction device has a routing aperture sized to encompass the inside wall and for routing the inside wall through the retraction device, and wherein the retraction device further has a retraction mechanism inside the retraction device to controllably retract the material of the inside wall through the routing aperture in a direction away from the folded tip, thereby decreasing the outside wall, creating more inside wall, and as such shortening the length of the flexible robot,
    wherein the retraction mechanism comprises two parallel aligned motor-driven rollers located inside the double walled flexible tubular robot, grounded to the folded tip of the double walled flexible tubular robot and operating on the inside wall with sufficient spacing for the inside wall, and wherein the parallel aligned motor-driven rollers retract the inside wall by rolling in opposite directions from each other and as such squeezing the inside wall as it is passed between the parallel aligned motor-driven rollers.

2. The system as set forth on claim 1, wherein the flexible robot is a pneumatically controlled flexible robot with a pneumatic pressure between the inside wall and the outside wall.

3. A method of controlling a flexible robot, comprising:
    (a) having a double walled flexible tubular robot with an inside wall, an outside wall, and a folded tip;
    (b) positioning a retraction device centrally located at the folded tip and grounded to the flexible robot itself and not an external environment, whereby the outside wall encloses the retraction device, and wherein the retraction device has a routing aperture sized to encompass the inside wall and for routing the inside wall through the retraction device; and (c) controllably retracting the material of the inside wall through the routing aperture in a direction away from the folded tip, thereby decreasing the outside wall, creating more inside wall, and as such shortening the length of the flexible robot, wherein the controllably retracting comprises using two parallel aligned motor-driven rollers two parallel aligned motor-driven rollers located inside the double walled flexible tubular robot, grounded to the folded tip of the double walled flexible tubular robot and operating on the inside wall with sufficient spacing for the inside wall, and wherein the parallel aligned motor-driven rollers retract the inside wall by rolling in opposite directions from each other and as such squeezing the inside wall as it is passed between the parallel aligned motor-driven rollers.

4. The method as set forth on claim 3, further comprising pneumatically controlling the flexible robot with a pneumatic pressure between the inside wall and the outside wall.

\* \* \* \* \*